United States Patent
Kootstra

(10) Patent No.: US 9,258,230 B2
(45) Date of Patent: Feb. 9, 2016

(54) IN FLIGHT TCP WINDOW ADJUSTMENT TO IMPROVE NETWORK PERFORMANCE

(75) Inventor: Lewis S. Kootstra, Roseville, CA (US)

(73) Assignee: HEWLETT PACKARD ENTERPRISE DEVELOPMENT LP, Houston, TX (US)

( * ) Notice: Subject to any disclaimer, the term of this patent is extended or adjusted under 35 U.S.C. 154(b) by 1308 days.

(21) Appl. No.: 11/582,269

(22) Filed: Oct. 17, 2006

(65) Prior Publication Data

US 2008/0089230 A1  Apr. 17, 2008

(51) Int. Cl.
*H04L 12/28* (2006.01)
*H04L 12/801* (2013.01)
*H04L 12/807* (2013.01)

(52) U.S. Cl.
CPC .............. *H04L 47/10* (2013.01); *H04L 47/193* (2013.01); *H04L 47/27* (2013.01)

(58) Field of Classification Search
USPC .............. 370/395.2, 395.21, 395.3, 231, 232, 370/233, 234, 235, 236.1
See application file for complete search history.

(56) References Cited

U.S. PATENT DOCUMENTS

| | | | |
|---|---|---|---|
| 5,043,882 A | 8/1991 | Ikeno ............................ | 364/200 |
| 6,076,113 A | 6/2000 | Ramanathan et al. ......... | 709/235 |
| 6,219,713 B1 * | 4/2001 | Ruutu et al. ................... | 709/235 |
| 6,438,101 B1 * | 8/2002 | Kalampoukas et al. ...... | 370/229 |
| 6,769,030 B1 * | 7/2004 | Bournas ......................... | 709/233 |
| 7,283,474 B1 * | 10/2007 | Bergenwall .................... | 370/235 |
| 7,478,160 B2 * | 1/2009 | Jennings, III ................. | 709/227 |
| 2001/0017844 A1 * | 8/2001 | Mangin ......................... | 370/231 |
| 2003/0154272 A1 * | 8/2003 | Dillon et al. .................. | 709/223 |
| 2005/0141419 A1 | 6/2005 | Bergamasco et al. ......... | 370/469 |
| 2005/0147123 A1 | 7/2005 | Asthana et al. ............... | 370/230 |
| 2006/0248582 A1 * | 11/2006 | Panjwani et al. .............. | 726/13 |
| 2007/0280111 A1 * | 12/2007 | Lund ............................. | 370/235 |
| 2008/0056124 A1 * | 3/2008 | Nanda et al. .................. | 370/229 |

OTHER PUBLICATIONS

Harry Newton, "Newton's Telecom Dictionary," Flatiron publishing Inc., New York, Mar. 2007.*

* cited by examiner

*Primary Examiner* — Jae Y Lee
*Assistant Examiner* — Thinh Tran
(74) *Attorney, Agent, or Firm* — Warn, Hoffmann, Miller & LaLone, PC

(57) ABSTRACT

A system and method for reconfiguring a TCP window in a switch of a network system, where the size of the window is determined based on the operating speed of a work station to which data packets in the window are being sent and the size of the switch buffer. The algorithm includes establishing a connection between a server and the station, where the connection includes TCP data packets. The algorithm identifies a TCP window size requested by the station, and identifies the connection speed of the station in the switch. The algorithm then modifies the TCP window size of the connection if the identified TCP window size does not support the connection speed and the size of the buffer. The algorithm also changes the TCP check-sum based on the new TCP window size.

16 Claims, 2 Drawing Sheets

IN FLIGHT TCP WINDOW ADJUSTMENT TO IMPROVE NETWORK PERFORMANCE

BACKGROUND

Networks typically employ one or more servers that store files and other information accessible by several work stations that are part of the network through a switch. When the server sends a particular file to a station, the TCP separates the file into data packets and transmits the data packets in groups referred to as TCP windows. The size of the TCP window determines how much data can be in flight between the server and a station at any given time. By defining TCP windows to include a plurality of data packets, the throughput can be increased because the station does not transmit an acknowledgment back to the server that it received the data packets until it has received all of the data packets in the TCP window, as opposed to sending an acknowledgment back each time it receives a data packet.

The size of the data packets will typically be about 1500 bytes. Certain known systems employ a 64 k byte TCP window size. Therefore, known TCP windows typically include about 42 data packets. Each data packet in a TCP window has a header that may include a 16-bit field that identifies how big the TCP window can be.

Typically, the server will be operating at a much faster speed than the stations. For example, the server may operate at 1 giga-bit/per second and the stations may operate at 100 mega-bits/per second. The server will send each TCP window at its faster speed that is received by the switch. The switch will then send the TCP windows to the appropriate station at the slower station speed. Because the switch is receiving the data packets from the server much faster than it is transmitting the data packets to the work station, the data packets are stored in a buffer in the switch until they can be transmitted to the station.

Because of the speed mismatch between the server and the stations, it is possible that data packets will be dropped as a result of the buffer being too small. Particularly, if the buffer is smaller than the TCP window size, a dropped packet may occur. The speed difference between the server and the stations and the interaction between the TCP and the SMB protocols combined with the size of the buffer influences the number of dropped packets that may affect system performance. If a dropped packet happens to be at the end of an upper layer protocol boundary, significant upper level protocol dependent time-out delays can occur resulting in poor throughput performance.

If a data packet does happen to be dropped, the TCP recognizes this because the station will not send an acknowledgment message back to the server acknowledging that it received all of the packets in the TCP window that were transmitted. When the server identifies a dropped packet, it will then resend the file starting with the dropped data packet.

One possible solution to the dropped packet problem referred to above is to provide more memory in the buffer, so that all of the data packets received by the switch from the server have a place to be stored before they are transmitted to the station. However, this solution has significant drawbacks because of the cost of providing so much memory to eliminate the problem. For example, it is desirable that the buffer memory be provided on the same application specific integrated circuit chip (ASIC) within the switch that includes the processor. If more memory is required beyond what can fit on the ASIC, and the ASIC has to connect to other chips having the additional memory, then the cost of the switch goes up considerably.

Another solution to the problem referred to above is to reconfigure the operating system, such as Windows™, to reduce the size of the TCP windows that it receives. This solution requires significant software knowledge, and is not trivial to perform, and therefore, it is generally not a viable solution.

DETAILED DESCRIPTION OF THE EMBODIMENTS

Figure 1:
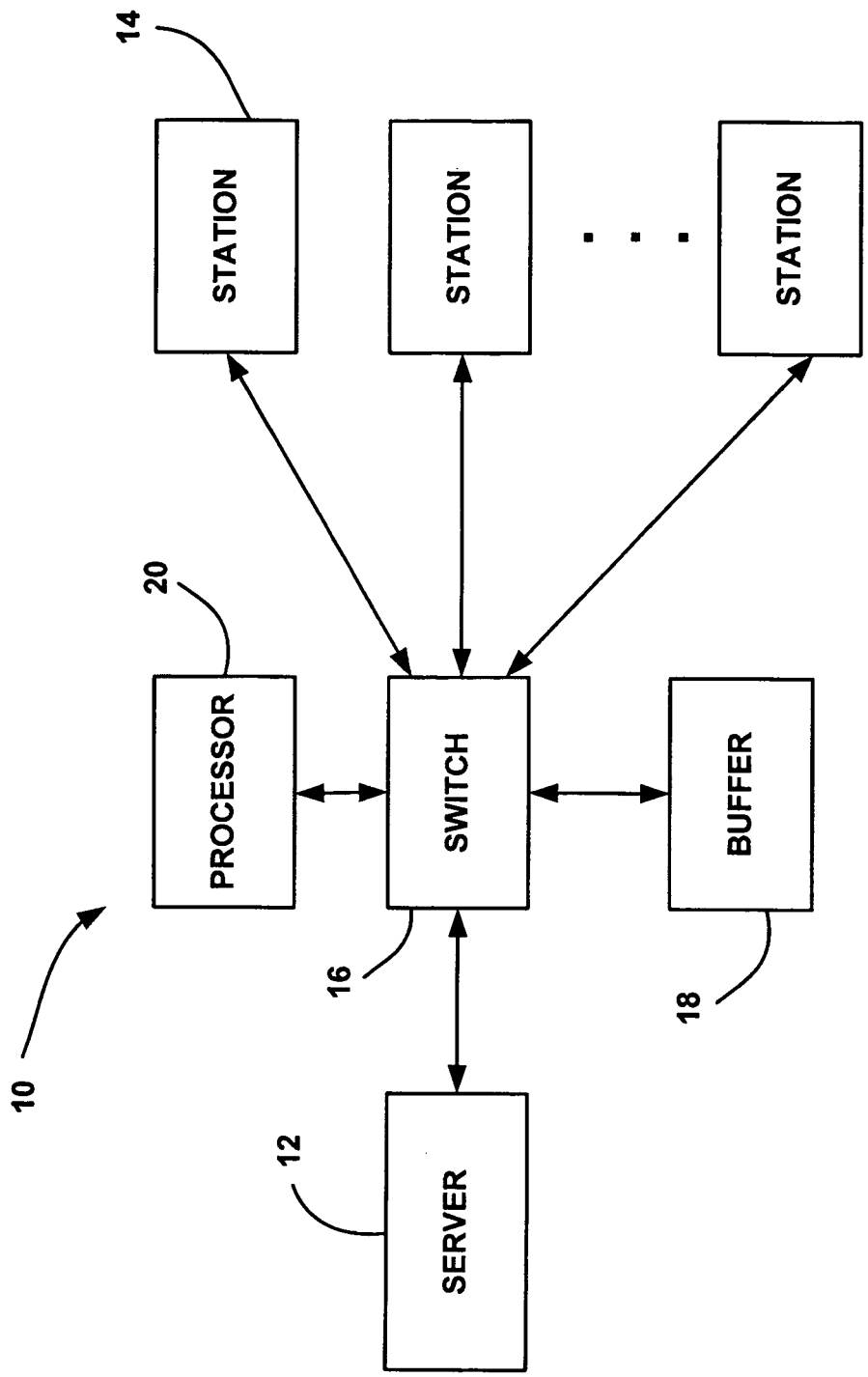
FIG. 1 is a block diagram of a network system.

FIG. 1 is a general block diagram of a network system 10 including a server 12 and work stations 14. Files are transferred back and forth between the server 12 and the stations 14. A particular station 14 may request a file from the server 12. The server 12 will send the file to the station 14 through a switch 16 using an identification number to identify the station 14. The transfer of files and other information between the server 12 and the stations 14 may be controlled by a transmission control protocol (TCP). The TCP may be part of a higher level protocol, such as a server message block (SMB) protocol. A buffer 18 stores data packets for transmission as discussed above. A processor 20 within the switch 16 controls the transfer of the signals through the switch 16 using the TCP.

Each TCP data packet received by the switch 16 is monitored, where the processor 20 in the switch 16 looks at each packet to determine transmission characteristics of the packet, particularly where the packet is to be transmitted. Each TCP window includes a header having a 16-bit field that identifies how big the TCP window can be. A TCP window target size identifies the size of the TCP window that can be handled by the connection speed of the station 14 and the size of the buffer 18. If the size of the TCP window is greater than the target size, then the processor 20 replaces the TCP window size identified in the header with a TCP window size equal to the target size identified by the connection speed of the station 14 and the size of the buffer 18.

When a work station 14 requests a TCP file from the server 12, the 16-bit field in the header of the request message identifies the size of the TCP window that is pre-programmed into the station 14, such as by Windows™. The server 12 responds to the file request from the station 14 in a negotiation to transmit the file through the TCP. During this negotiation between the server 12 and the station 14, the number of data packets transmitted between the server 12 and the station 14 is generally small, and does not present a problem for the size of the buffer 18 and the connection speed of the station 14. As the processor 20 is monitoring the TCP packets being transmitted between the server 12 and the station 14, it will determine whether the requested TCP window size for the station 14 can be supported by the connection speed of the station 14 and the size of the buffer 18. If the processor 20 determines that the requested TCP window size can not be supported by the connection speed of the station 14 and the size of the buffer 18, then it will change the 16-bit field in the header to change the TCP window to a size that will be supported by the connection speed of the station 14 and the size of the buffer 18.

Once the server 12 receives the new TCP window size, it will send data packets for that window size, and the likelihood of dropped packets will be reduced, preferably to zero. The processor 20 will continue to monitor the 16-bit field in the header of the TCP data packets as they are transmitted from the server 12 to the station 14 to ensure that the TCP window size is maintained as previously set.

As discussed above, the processor 20 in the switch 16 adjusts the size of the TCP window based on connection speed of the station 14 and the size of the buffer 18. In an alternate embodiment, the processor 20 can set the TCP window size based solely on the size of the buffer 18 and other switch limitations. Particularly, the processor 20 would change every TCP window size to a predetermined window size for every TCP data packet transmission between the server 20 and the station 14. In one non-limiting embodiment, the TCP window size is 8 k bytes.

Each TCP data packet also includes a check-sum that is used to determine whether the data packet is valid. As is well understood to those skilled in the art, an extra digit or digits, called the check-sum digit(s), are sometimes added to the header of a data packet to check for errors after the data packet has been transmitted. In one embodiment, the check-sum exclusive-ORs a group of bits in the header with the next same size group of bits in the header all the way through the header to provide an accumulated value that must match a predetermined value to establish that the data packet is valid. If the switch 16 changes the TCP window size, it should also change the TCP check-sum to validate the new TCP window size. In other words, any time the data packet is modified, the TCP check-sum is also modified.

Figure 2:
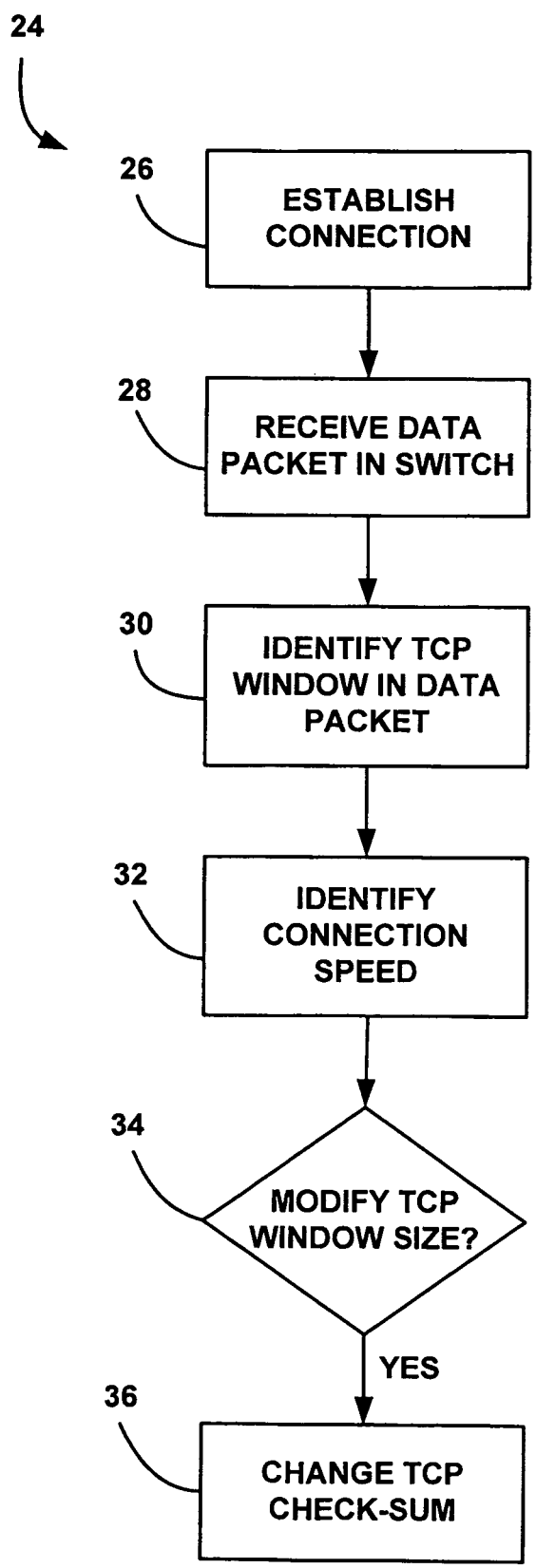
FIG. 2 is a flow chart diagram showing a process for changing the size of a TCP window in a network switch in the network shown in FIG. 1.

FIG. 2 is a flow chart diagram 24 showing the operation of the system 10 for changing the TCP window size as discussed above. At box 26, the server 12 and the particular station 14 establish a connection to transmit a TCP file or other information. During the negotiation between the server 12 and the station 14, the processor 20 is looking at the TCP data packets as identified at box 28. During the negotiation between the server 12 and the work station 14, the work station 14 will request a particular TCP window size. That TCP window size will be identified in a field of a header in the data packets being transmitted between the server 12 and the work station 14. During the negotiation, the window size used by the server 12 is typically small. The processor 20 will identify the requested TCP window size by the station 14 in the field in the header of the data packet at box 30. Also, the processor 20 will identify the connection speed of the station 14 at box 32. The processor 20 will reconcile the requested window size, the connection speed of the station 14, and the size of the buffer 18, and will modify the size of the TCP window at diamond 34 if necessary, as discussed above. If the processor 20 does modify the TCP window size at the diamond 34, then it will change the TCP check-sum at box 36, as also discussed above.

In one example, the station 14 is running Windows™ that typically requires a 64 k byte TCP window size. Further, the connection speed to the station 14 may be 100 mega-bits/per second. The processor 20 in the switch 16 may reduce the window size to an 8 k byte window size, which would accommodate about five TCP data packets.

Based on the discussion above, the technique of changing the size of the TCP windows may offer a number of advantages in a local area network (LAN) environment. This is because the distance that the TCP data packets have to travel is relatively short. Fewer advantages may be realized in a wide area network (WAN) environment where large TCP window sizes can provide performance advantages because of the transmission distances. The advantages in a LAN environment include reducing the size of the buffer 18, possibly providing the buffer 18 and the processor 20 on the same chip, and providing an improved packet throughput in speed mismatched situations with essentially no additional cost.

The foregoing discussion discloses and describes merely exemplary embodiments. One skilled in the art will readily recognize from such discussion, and from the accompanying drawings and claims, that various changes, modifications or variations can be made therein without departing from the spirit and scope of the embodiments as defined in the following claims.

What is claimed is:

1. A communications method comprising:
   establishing a TCP connection between a server and a work station through a switch, wherein the server and the work station are in communication with the switch via a single network;
   in the switch, communicating TCP data packets associated with the TCP connection between the server and the work station;
   in the switch and prior to any modification of a TCP window size by the switch, determining a target TCP window size for the TCP connection between the server and the work station through the switch based on a connection speed of the work station and a size of a buffer in the switch, wherein at least one of the TCP data packets includes a header having a field that identifies a size of the TCP window;
   in the switch, determining that the TCP window size of the TCP connection is larger than the target TCP window size;
   in the switch, replacing the TCP window size of the TCP connection identified in the field of the header with a TCP window size equal to the target TCP window size as a result of the determining that the TCP window size of the TCP connection is larger than the target TCP window size.

2. The method according to claim 1 further comprising changing a TCP check-sum in the data packets based on the modified TCP window size.

3. The method according to claim 1 wherein replacing the TCP window size of the TCP connection includes replacing the TCP window size of the TCP connection when the server and the work station are establishing the TCP connection to transmit a file prior to transmitting the file.

4. The method according to claim 1, further comprising identifying the TCP window size in the header field of a data packet transmitted from the work station.

5. The method of claim 1 wherein the TCP connection has only two endpoints, wherein the endpoints of the TCP connection comprise the server and the work station.

6. The method of claim 1 further comprising:
   in the switch, receiving one of the TCP data packets from the work station, the one of the TCP data packets comprising the TCP window size of the TCP connection requested by the work station identified in a field of a header of the one of the TCP data packets;
   replacing the TCP window size identified in the header field of the one of the TCP data packets with a modified TCP window size of the TCP connection to modify the one of the TCP packets; and
   outputting the modified one of the TCP data packets to the server.

7. A method for changing transmission control protocol (TCP) window sizes in data transmissions, said method comprising:

establishing a TCP connection between a server and a work station through a switch, wherein the server and the work station are in communication with the switch via a single network;

in the switch, communicating TCP data packets associated with the TCP connection between the server and the work station, wherein at least one of the TCP data packets includes a header having a field that identifies a desired TCP window size for the TCP connection;

determining a target TCP window size for the TCP connection between the server and the work station through the switch based on a connection speed of the work station and a size of a buffer in the switch; and in the switch, replacing the desired TCP window size identified in the header field of the at least one TCP data packet with the determined target TCP window size if the desired TCP window size does not match the determined target TCP window size.

8. The method according to claim 7 wherein replacing the TCP window size of the TCP connection includes replacing the TCP window size of the TCP connection identified in the field of the header of the at least one TCP data packet when the server and the work station are establishing the TCP connection to transmit a file prior to transmitting the file.

9. The method of claim 7 further comprising:
subsequent to the replacing of the desired TCP window size of the TCP connection and using the switch, receiving one of the TCP data packets associated with the TCP connection from the server;
in the switch, verifying that the one of the TCP data packets received from the server comprises the desired TCP window size; and
subsequent to the verifying and using the switch, forwarding the one of the TCP data packets to the work station.

10. The method of claim 7 wherein the switch is physically distinct from both the server and the work station and wherein the switch is connected to the server via at least a first link and is connected to the work station via at least a second link.

11. The method of claim 7 wherein the predetermined TCP window size is determined prior to the establishing of the TCP connection.

12. A network node comprising:
a switch to:
communicate transmission control protocol (TCP) data packets associated with a TCP connection established between a server and a work station, wherein the server and the work station are in communication with the switch through a single network,
identify a TCP window size of the TCP connection requested by the work station in a header field of a data packet transmitted from the work station,
identify a connection speed of the work station,
determine a target TCP window size for the TCP connection between the server and the work station through the switch based on the identified connection speed of the work station and a size of a buffer in the switch;
replace, in the switch, the TCP window size of the TCP connection identified in the header field of the data packet with the determined target TCP window size;
verify that one of the TCP data packets received from the server comprises the replaced TCP window size, and
forward the one of the TCP data packets comprising the replaced TCP window size to the work station as a result of the verification.

13. The network node according to claim 12 wherein the switch is further to change a TCP check-sum based on the modified TCP window size.

14. A network node comprising:
a packet switch to:
communicate TCP data packets associated with a TCP connection between a first device and a second device, wherein the first device and the second device are in communication with the packet switch via a single network;
receive an indication comprising a desired TCP window size from the first device connected to a first port of the packet switch, wherein the desired TCP window size is contained in a header field of a data packet transmitted from the first device;
identify a connection speed of the first device;
determine a replacement TCP window size for the TCP connection between the first device and the second device based upon the identified connection speed of the first device and a size of a buffer in the packet switch;
replace, in the packet switch, the desired TCP window size identified in the header field of the data packet with the replacement TCP window size; and
output the data packet including the replacement TCP window size to the second device connected to a second port of the packet switch.

15. The network node of claim 14 wherein the packet switch is further to determine that the connection speed and the size of the buffer do not support the desired TCP window size and to replace the desired TCP window size with the replacement TCP window size as a result of the determination that the connection speed and the size of the buffer do not support the desired TCP window size.

16. The network node of claim 14 wherein the TCP connection has only two endpoints, neither of which resides on the packet switch.

* * * * *